(12) United States Patent
Hauge et al.

(10) Patent No.: US 11,427,285 B2
(45) Date of Patent: Aug. 30, 2022

(54) SLIT FAIRING FOR TOWED MARINE EQUIPMENT

(71) Applicant: PGS Geophysical AS, Oslo (NO)

(72) Inventors: Thomas Hauge, Oslo (NO); Rune Tønnessen, Lommedalen (NO)

(73) Assignee: PGS Geophysical AS, Oslo (NO)

( * ) Notice: Subject to any disclaimer, the term of this patent is extended or adjusted under 35 U.S.C. 154(b) by 352 days.

(21) Appl. No.: 16/717,601

(22) Filed: Dec. 17, 2019

(65) Prior Publication Data

US 2020/0198738 A1   Jun. 25, 2020

Related U.S. Application Data

(60) Provisional application No. 62/866,394, filed on Jun. 25, 2019, provisional application No. 62/782,190, filed on Dec. 19, 2018.

(51) Int. Cl.
| | |
|---|---|
| *B63B 21/66* | (2006.01) |
| *B60D 1/18* | (2006.01) |
| *G01V 3/17* | (2006.01) |
| *G01V 1/38* | (2006.01) |
| *B60D 1/00* | (2006.01) |

(52) U.S. Cl.
CPC ............ *B63B 21/663* (2013.01); *B60D 1/187* (2013.01); *G01V 1/3826* (2013.01); *G01V 3/17* (2013.01); *B60D 2001/008* (2013.01); *B63B 2021/666* (2013.01)

(58) Field of Classification Search
CPC . B63B 21/663; B63B 2021/666; B60D 1/187; B60D 2001/008; G01V 1/3826
See application file for complete search history.

(56) References Cited

U.S. PATENT DOCUMENTS

| | | | | |
|---|---|---|---|---|
| 3,233,571 | A | * 2/1966 | Rather | ................. G01V 1/3826 |
| | | | | 114/243 |
| 3,899,991 | A | * 8/1975 | Chatten | ................. B63B 21/663 |
| | | | | 114/243 |
| 4,365,574 | A | * 12/1982 | Norminton | ........... B63B 21/663 |
| | | | | 405/211 |
| 4,700,651 | A | 10/1987 | Hale | |
| 5,532,975 | A | * 7/1996 | Elholm | ................ G01V 1/3826 |
| | | | | 114/244 |
| 5,909,408 | A | * 6/1999 | Warnan | ................ G10K 11/006 |
| | | | | 114/244 |
| 2016/0257421 | A1 | * 9/2016 | Ye | ......................... G07C 5/0858 |
| 2020/0198738 | A1 | * 6/2020 | Hauge | ..................... G01V 3/17 |

FOREIGN PATENT DOCUMENTS

GB                 2133362 A   *   7/1984   ........... B63B 21/663

* cited by examiner

*Primary Examiner* — S. Joseph Morano
*Assistant Examiner* — Jovon E Hayes

(57) ABSTRACT

Apparatus and techniques are disclosed relating to towing marine equipment. In some embodiments, a vessel tows equipment through a body of water using a towing member with an associated fairing that includes a slit, such that an axis of the slit is non-perpendicular to a portion of the towing member from which the fairing extends.

34 Claims, 13 Drawing Sheets

SLIT FAIRING FOR TOWED MARINE EQUIPMENT

CROSS-REFERENCE TO RELATED APPLICATIONS

This application claims priority to U.S. Provisional Patent Application No. 62/782,190, filed on Dec. 19, 2018, and to U.S. Provisional Patent Application No. 62/866,394, filed on Jun. 25, 2019, each of which is hereby incorporated by reference as if entirely set forth herein.

BACKGROUND

Geophysical surveys are often used for oil and gas exploration in geophysical formations, which may be located below marine environments. Various types of towing members (e.g., cables), attached to a survey vessel, may tow marine geophysical survey elements (e.g., sources, sensor streamers, buoys, etc.) behind the survey vessel in different configurations during geophysical surveys. Survey elements may be positioned along or at the end of towing members, for example.

During the course of a geophysical survey, sensors may collect data indicative of geological structures, which may be analyzed, e.g., to determine the possible locations of hydrocarbon deposits. Generally, performing surveys with larger arrays of sources or streamers may reduce survey passes needed for a given area or improve imaging resolution. Greater numbers of survey elements, however, may increase drag forces on the array.

Figure 1:
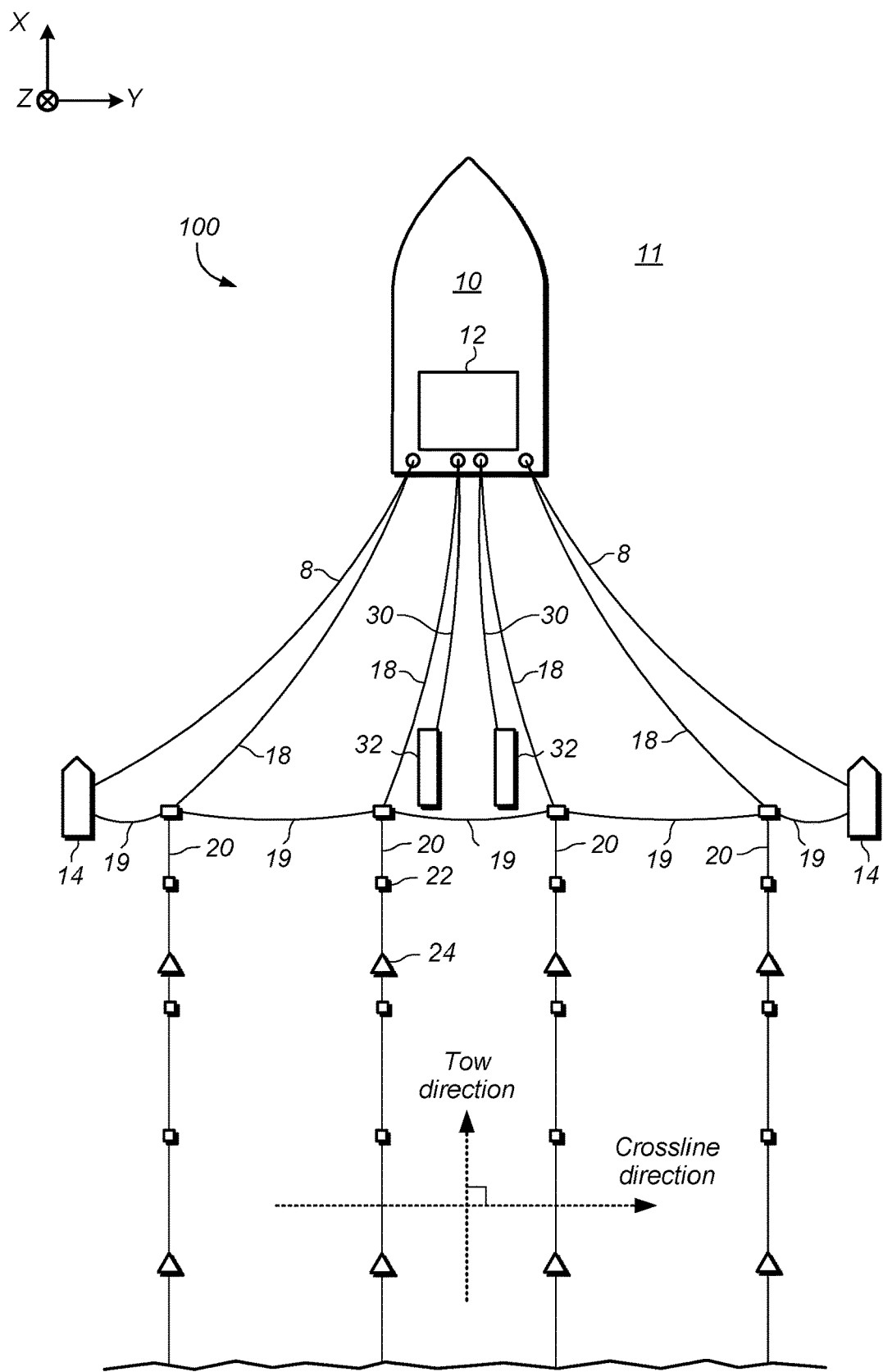
FIG. 1 illustrates an example marine geophysical survey system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to tow survey equipment" is intended to cover, for example, a module that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Should Applicant wish to invoke Section 112(f), Applicant will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

DETAILED DESCRIPTION

Overview of a Geophysical Survey

Referring to FIG. 1, an illustration of a marine geophysical survey system 100 is shown (not necessarily to scale), according to some embodiments. In the illustrated embodiment, system 100 includes survey vessel 10, sources 32, source cables 30, paravanes 14, and streamers 20 (streamers 20 are shown truncated at the bottom of FIG. 1.). In some embodiments, survey vessel 10 may be configured to move along a surface of a body of water 11 such as a lake or ocean. In the illustrated embodiment, survey vessel 10 tows streamers 20, sources 32, and paravanes 14, which may be used to provide a desired amount of spread among streamers 20. In other embodiments, streamers 20 with sources 32 may be towed by a separate vessel (not shown), rather than survey vessel 10. All of the equipment being towed may be referred to herein generally as the towed array or the towed survey array.

In some embodiments, streamers 20 may include sensors 22 (e.g., hydrophones, geophones, electromagnetic sensors, etc.). In other embodiments, streamers 20 may further include streamer steering devices 24 (also referred to as "birds") which may provide selected lateral or vertical forces to streamers 20 as they are towed through the water, typically based on wings or hydrofoils that provide hydrodynamic lift. In some embodiments, streamers 20 may further include tail buoys (not shown) at their respective aft ends.

In some embodiments, survey vessel 10 may include equipment, shown generally at 12 and for convenience collectively referred to as a "recording system." In some embodiments, recording system 12 may include devices such as a data recording unit (not shown separately) for making a record of signals generated by various geophysical sensors. Recording system 12 may also include navigation equipment (not shown separately), which may be configured to control, determine, and record the geodetic positions of: survey vessel 10, sources 32, streamers 20, sensors 22, etc., according to some embodiments. In the illustrated embodiment, streamers 20 are coupled to survey vessel 10 via cables 18. Paravanes 14, in the illustrated embodiment are towed by super-wide rope elements 8. Spreader cables 19, in the illustrated embodiment, are connected between streamers 20 or between a streamer 20 and a paravane 14. Elements 8, 18, and 19 are non-limiting examples of two members that may incorporate or be attached to fairings according to the various embodiments discussed in detail below.

In the illustrated plot, a Cartesian coordinate system having three orthogonal, spatial coordinate axes labeled x, y and z is used to specify orientations and coordinate locations within the body of water 11. The x and y axes are perpendicular to one another and are substantially parallel to the surface of body of water 11. The z axis is perpendicular to both the x and y axes (i.e., perpendicular to the surface of body of water 11) with the positive z direction pointing downward away from the surface of body of water 11. A tow direction, also referred to herein as an "in-line" direction, is shown in the drawing as being parallel to the x axis. In general, for any selected point in the towed array, tow direction is defined as the instantaneous direction in which the selected point moves as the towed array follows the towing vessel. For a given point and for a given instant of time, the tow direction may or may not be the same as the course of the towing vessel at that time, owing to a variety of factors such as water currents, whether the towing vessel is turning the towed array, etc. Similarly, for any selected point in the towed array, a cross-line direction is defined to be perpendicular to the tow direction at that point, and is shown in the drawing as being parallel to they axis.

Collectively, the survey data that is recorded by recording system 12 may be referred to as "marine survey input data," according to some embodiments. In embodiments where the survey being performed is a seismic survey, the recorded data may be more specifically referred to as "marine survey seismic data," although the marine survey input data may encompass survey data generated by other techniques. In various embodiments, the marine survey input data may not necessarily include every observation captured by sensors 22 (e.g., the raw sensor data may be filtered before it is recorded). Also, in some embodiments, the marine survey input data may include data that is not necessarily indicative of subsurface geology, but may nevertheless be relevant to the circumstances in which the survey was conducted (e.g., environmental data such as water temperature, water current direction or speed, salinity, etc.). In some embodiments, Geodetic position (or "position") of the various elements of system 100 may be determined using various devices, including navigation equipment such as relative acoustic ranging units or global navigation satellite systems (e.g., a global positioning system (or "GPS")).

In some embodiments, a geophysical data product may be manufactured according to techniques described in this disclosure. A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the computer-readable medium. In other instances, as noted above, the data may first be digitized or conditioned prior to being stored in the computer-readable medium. In yet other instances, the data may be fully processed into a two- or three-dimensional map of the various geophysical structures, or another suitable representation, before being stored in the computer-readable medium. The geophysical data product may be manufactured during the course of a survey (e.g., by equipment on a vessel) and then, in some instances, transferred to another location for geophysical analysis, although analysis of the geophysical data product may occur contemporaneously with survey data collection.

Example Angle of Inclination of a Towing Member

Figure 2:
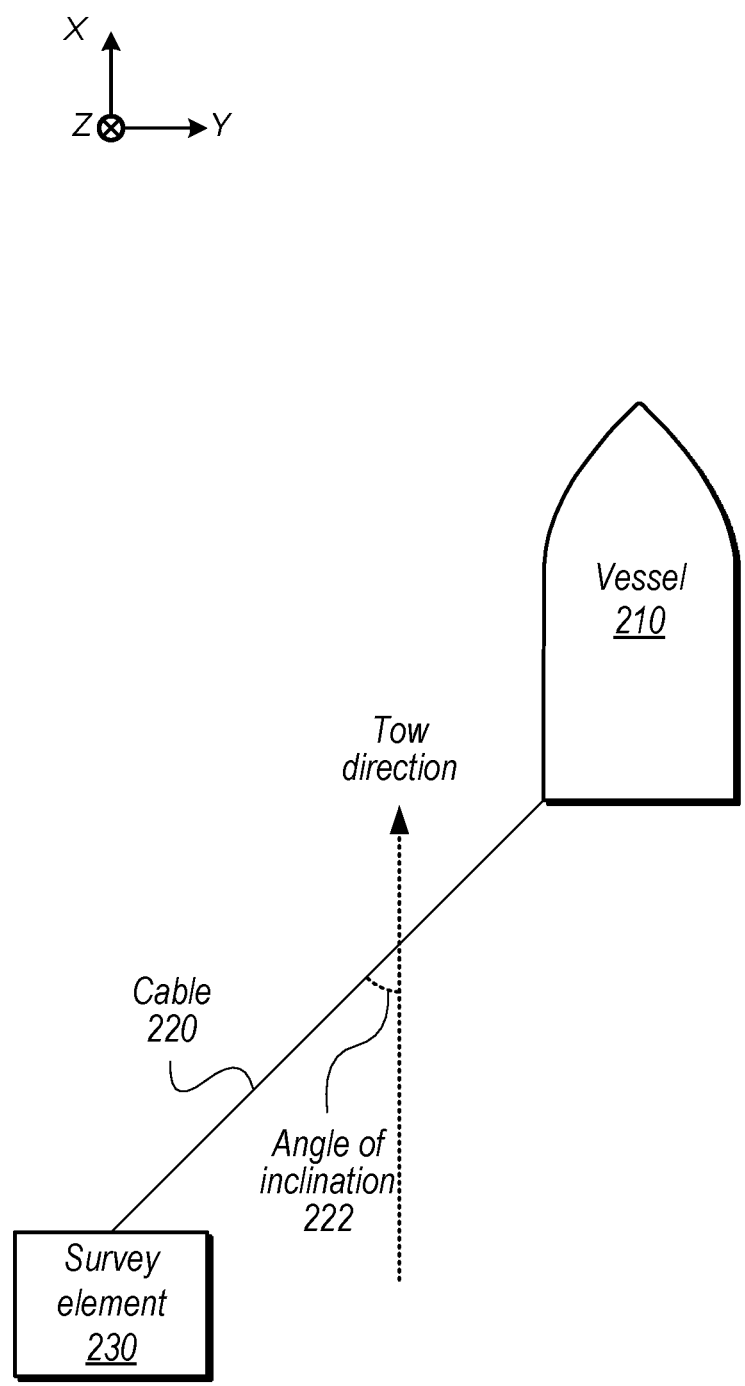
FIG. 2 illustrates a simplified example angle of inclination of a cable towing a survey element behind a survey vessel, according to some embodiments.

FIG. 2 illustrates, in simplified form, an example angle of inclination 222 formed by a cable 220 towing a survey element 230 such as a paravane 14 behind a survey vessel 210, according to some embodiments. In this simplified example, cable 220 forms a straight line segment between vessel 210 and survey element 230, and angle of inclination 222 is the acute angle formed between the line of cable 220 and the line of the tow direction. The illustrated angle of inclination 222 is 45° relative to the tow direction, but various angles of inclination may be used for various surveys, survey portions, different survey elements, etc. The angle of inclination may be controlled by one or more steering devices. Cable 220 alone, or in combination with other elements, is an example of means for towing survey equipment behind a vessel through a body of water. Note that the illustrated example is simplified in the sense that the cable 220 may, in general, be curved due to bending during tow, as will be discussed in further detail below.

Survey element 230 may be any of various types of survey equipment (such as those discussed above with reference to FIG. 1) towed behind vessel 210 during a survey. For example, survey element 230 may be a survey source or a sensor streamer.

As a survey vessel moves through the water, cable 220 moves through the water in the in-line direction (the x direction in the illustrated example). This movement may create vortices on the trailing side of the cable, where the vortices detach periodically from the top and bottom of the cable. This phenomenon is often referred to as vortex shedding. Vortex shedding may induce vibration in a cable, e.g., when the vortex shedding frequency matches an eigenfrequency of the cable. Cable vibration may cause wear and ultimately premature failure of towing equipment. Vibration may also increase the drag coefficient of the cable, increasing the force needed to move the cable through the body of water at a particular velocity.

In various embodiments discussed below, one or more fairings are attached to or included in a tow member. Each fairing may include at least one slit that defines a slit axis such that the slit axis intersects the tow member at an intersection point. A tangent line to the tow member at the intersection point defines an angle of inclination relative to the in-line direction, and also defines a slit angle relative the slit axis. In some embodiments, the slit angle is less than the angle of inclination, and both angles are acute angles. Fairing with one or more slits of this type may reduce vibration or drag relative to traditional implementations.

Speaking generally, angled fairing slits may cause the tail (or trailing end) of the fairing to move responsive to the water flowing over the towing member, which may advantageously avoid hydrodynamic lift by the fairing. This advantage may be further enhanced with the use of fairing slits that align with the perturbed water flow. In addition, fairing with slits may advantageously improve handling of the fairing, as well as the towing member to which the fairing is attached, while reeling the towing member into and out of the vessel. As discussed above, reducing vibration and drag may advantageously increase equipment life and may facilitate towing larger survey arrays.

Example Fairing with Angled Slits

Figure 3A:
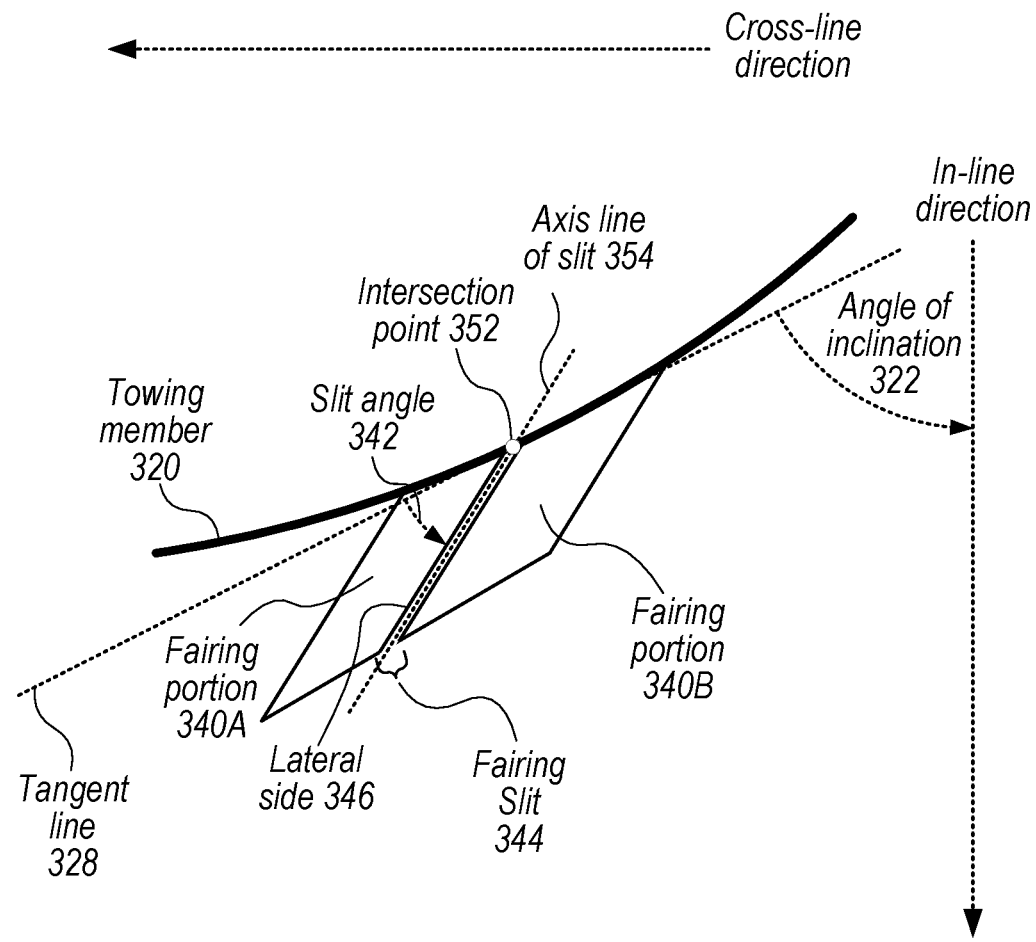
FIGS. 3A-3D illustrate example fairing slits with slit angles that are smaller than an angle of inclination of a towing member, according to some embodiments.

FIGS. 3A-3D illustrate example slit angles for a towing member fairing wherein the towing member exhibits a curved shape during tow, according to some embodiments. FIG. 3A is a diagram showing two different fairing portions 340A and 340B that are intersected by a fairing slit 344, according to some embodiments. In the illustrated example, fairing 340 is installed on towing member 320. Fairing 340 is included in or attached to towing member 320 at one end of the fairing, while the other end of the fairing extends behind the towing member during tow, in the illustrated example.

In the illustrated example, an axis line 354 of the fairing slit (the slit axis) intersects the towing member 320 at an intersection point 352. Tangent line 328 is tangent to the towing member 320 at intersection point 352 and defines an angle of inclination 322 relative to the in-line direction (in various embodiments, a reference line defining one or more angles may be a line that is tangent to a curved towing member or that is parallel to a linear towing member). (Note that towing member 320 may have different tangent lines at various points along its length, as will be discussed further in relation to FIG. 7.) In general, angle of inclination is defined herein to mean, for a line that is tangent to a tow member at a selected point, the smaller of the two distinct angles formed by the intersection of the tangent line and the tow direction line at the selected point. In virtually all cases of interest herein, the angle of inclination will be a non-zero acute angle. In the special case where the tangent line and the tow direction are perpendicular, the angle of inclination is defined herein to mean 90 degrees.

In the illustrated example, slit axis 354 defines a slit angle 342 relative to tangent line 328. In general, slit angle is defined herein to mean, for a line that is tangent to a fairing-equipped tow member at a point where a slit axis of the fairing intersects the tow member, the smaller of the two distinct angles formed by the intersection of the tangent line and the slit axis line. In virtually all cases of interest herein, the slit angle will be a non-zero acute angle.

In the illustrated embodiment, the towing is performed such that the slit axis is not parallel to the in-line direction and is not perpendicular to a reference line that is tangent or parallel to the towing member at the intersection point.

In some embodiments, the slit angle 342 is less than the angle of inclination 322. In some embodiments, slit angle 342 is at least 5 degrees less than the angle of inclination 322. In some examples, the fairing is parallel to the xy-plane and the surface of the water when towed, but in other examples the fairing may not be parallel, e.g., when different parts of the tow member are at different depths. In either case, tangent line 328 may be taken to be in the plane of the fairing. Fairing 340 alone, or in combination with other elements, is an example of means for controlling vibration of towing means (e.g., towing member 320).

Figure 3B:
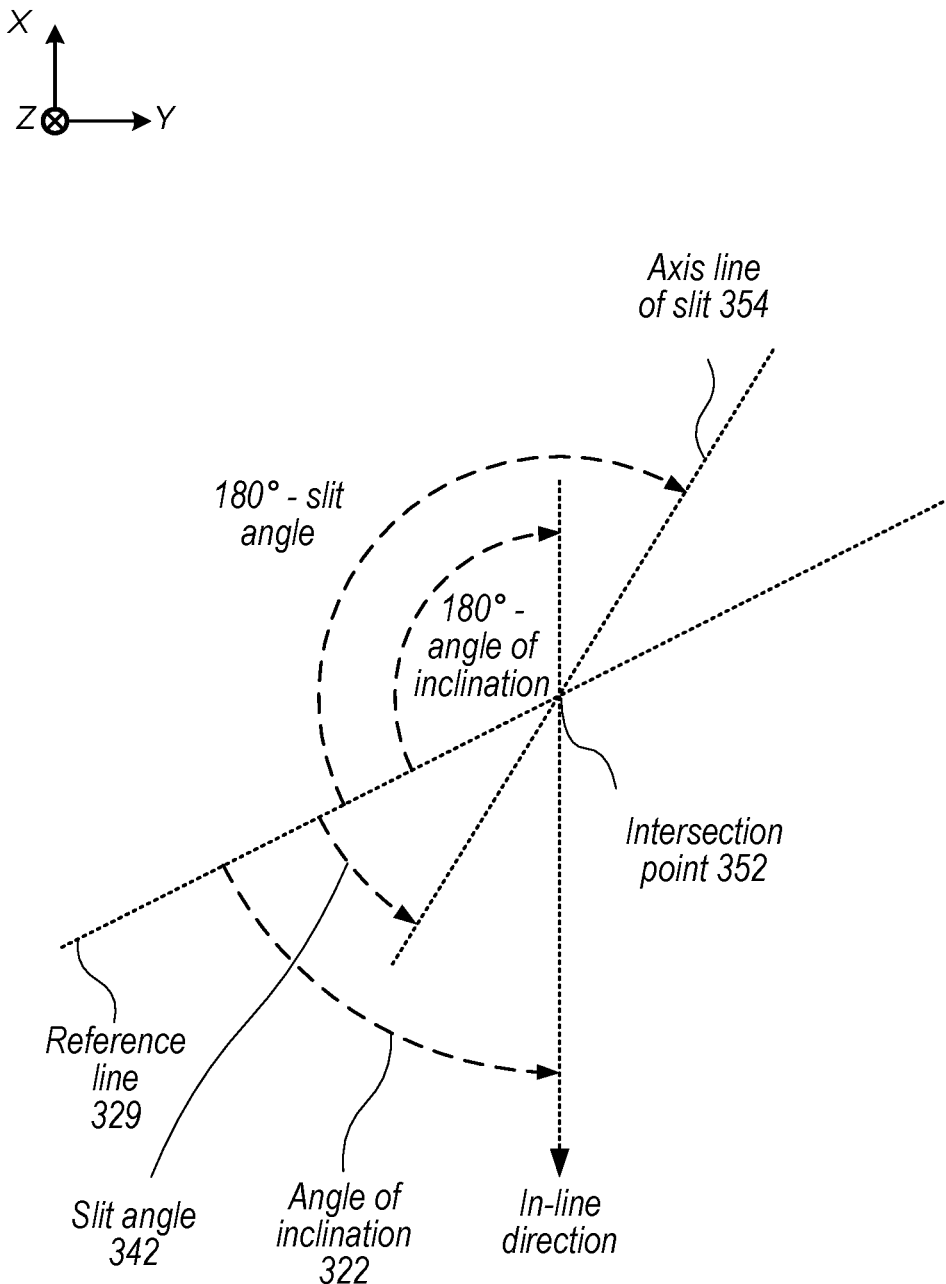

FIG. 3B is a diagram illustrating an example relationship between the angle of inclination and the slit angle of FIG. 3A, according to some embodiments. As shown, the slit angle is formed by the reference line 329 and the axis of the slit and the angle of inclination is formed by the reference line and the in-line direction. Both angles are acute and the slit angle is smaller than the angle of inclination. Note that the two lines that form each angle also form another angle, having values of 180 degrees minus the slit angle and 180 degrees minus the angle of inclination respectively. The slit angle and its supplemental angle represent the two distinct angles (that sum to 180 degrees) formed by the slit axis and the reference line. When the slit angle and angle of inclination are acute, the supplemental angles are obtuse. In various embodiments, the slit angle is measured in the same direction as the angle of inclination, such that when the two acute angles are overlayed with a common intersection point as shown, at least a portion of their arc overlaps.

Figure 3C:
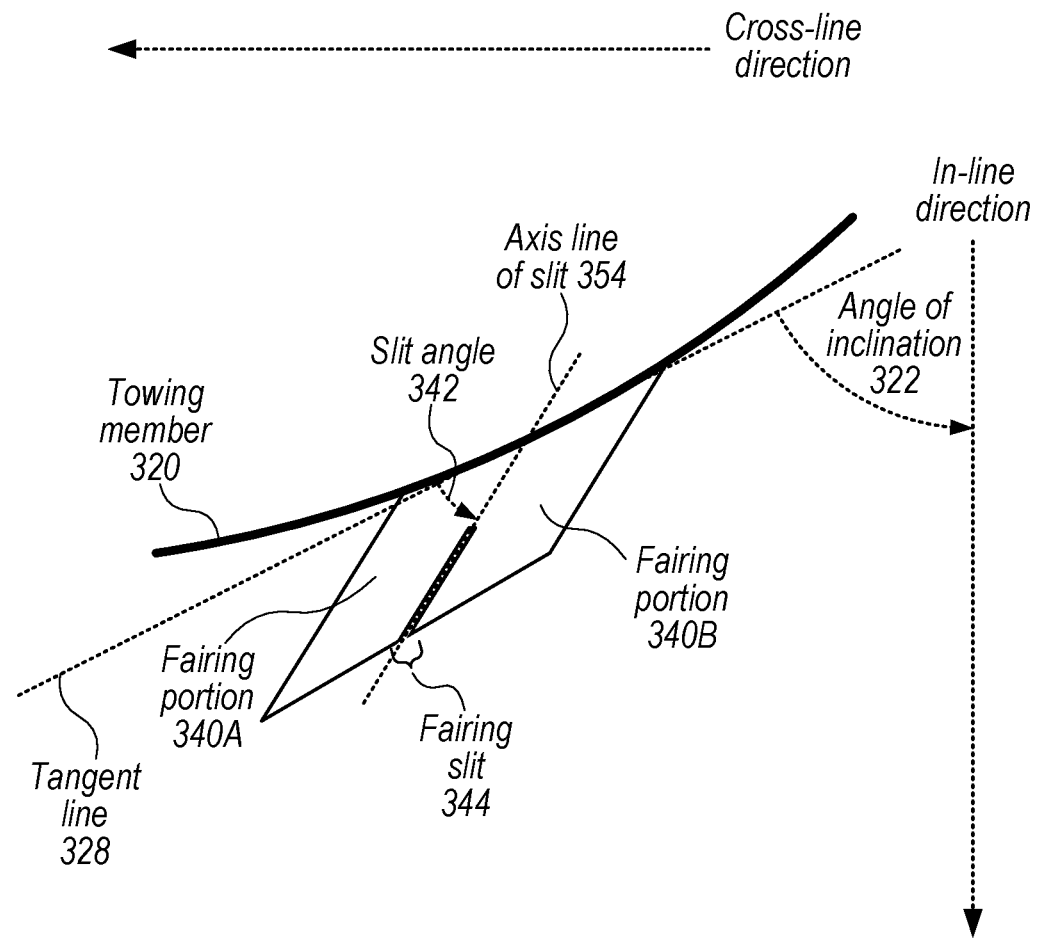

FIG. 3C is a diagram showing a fairing slit 344 that does not extend across the entire width of the fairing 340 that is included in or attached to a curved towing member 320, according to some embodiments. In the illustrated example, slit angle 342 is measured from the tangent line 328 to the axis line 354 of the fairing slit 344, even though the slit does not extend all the way to towing member 320.

Figure 3D:
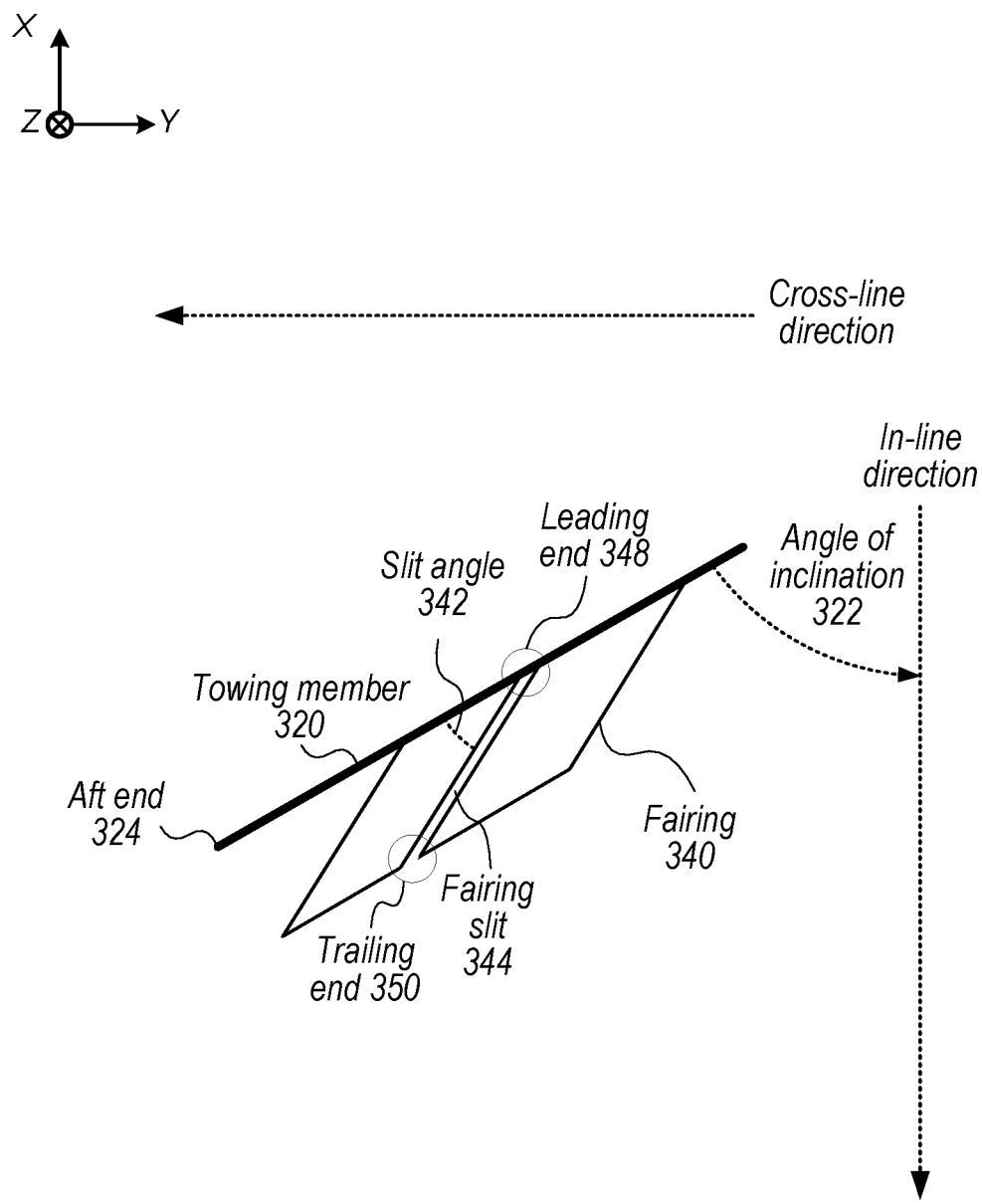

FIG. 3D is a diagram of a slit configuration similar to FIG. 3A, but with explicit annotations for leading and trailing ends of the fairing slit. As shown, similarly to FIGS. 3A and 3C, fairing slit 344 is non-perpendicular to towing member 320 and the trailing end 350 of the fairing slit is closer, in the cross-line direction, to an aft end 324 of the towing member (the end that is not attached to the survey vessel) than is the leading end 348 of the fairing slit. Slits with this property will have slit angles that are smaller than the angle of inclination.

In some embodiments, the angle of one or more fairing slits is at least 5 degrees, at least 10 degrees, at least 15 degrees, etc. less than the angle of inclination. In some test scenarios, fairings with slit angles that are 5, 10, or 15 degrees less than the angle of inclination have reduced the drag coefficient of a towing member by various degrees, such as a tenth, a fourth, a half, etc. Note that the range of differences between slit angle and angle of inclination with advantageous properties may vary based on various other parameters, such as the diameter of the towing member, the width of the fairing, the anticipated curve of the towing member during tow, etc. In some embodiments, the angle of one or more fairing slits falls within a range of values that is less than the angle of inclination. For example, the slit angles of one or more fairing slits may be between 15 and 40 degrees less than the angle of inclination, or between 40 percent and 85 percent of the angle of inclination. These ranges may provide reduced vibration or drag in some embodiments.

Note that, in FIG. 3D, the example fairing slit 344 extends from the trailing end 350 of fairing 340 to towing member 320 (e.g., across the entire width of the fairing). In other embodiments, however, the slit may extend across only a portion of the width of the fairing, such as the slit shown in FIG. 3C, and thus may not reach towing member 320. Although the embodiments shown in FIGS. 3A-3D each illustrate a single fairing slit 344, fairings according to embodiments may in general include multiple slits, as does the fairing shown in FIG. 4 and discussed below. For example, slits may be included at intervals along all or a portion of the length of the towing member fairing.

Note that the angle of inclination of a towing member may be a planned angle for a given survey, but the actual angle of inclination may differ during tow. For example, as a towing member moves through a body of water during a marine geophysical survey, the angle of inclination of the towing member may vary. Thus, the various relationships between slit angle and angle of inclination discussed herein may be nominal relationships, which may vary to within acceptable thresholds under actual survey conditions.

Fairings may be implemented using various materials, including without limitation: canvas, metal, plastic, rubber, composites, etc. A fairing may be included in a cable in various ways. For example, a fairing may comprise an extension of an outer cable cover, may comprise a separate component that is coupled to the cable, or may be integrally formed with the cable. Similarly, a fairing may be attached to a cable in various ways, e.g., by using attachment equipment such as clips, by sliding a sleeve of the fairing over the towing member, by wrapping the fairing around the towing member and leaving a tail behind the towing member, by magnetic attachments, etc.

Figure 4:
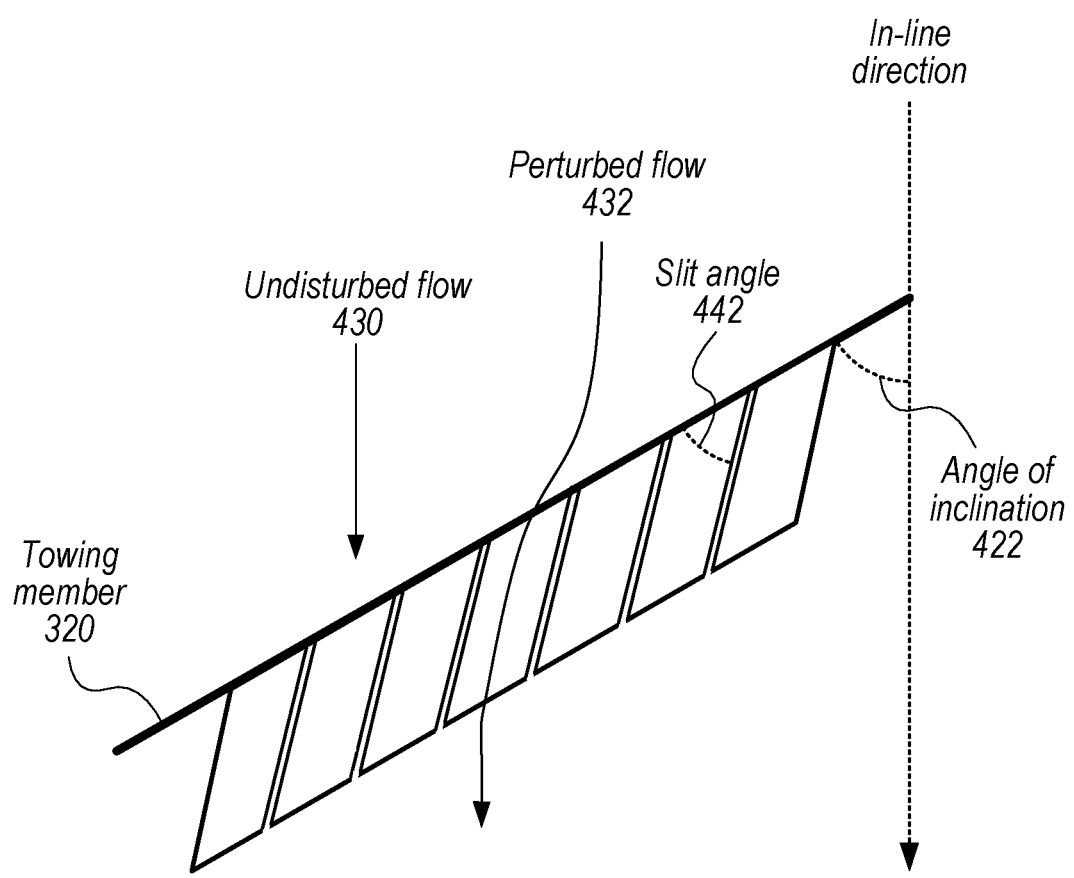
FIG. 4 illustrates example water flow perturbation by a towing member that includes fairing with angled slits, according to some embodiments.

FIG. 4 illustrates an example of water flow relative to a towing member, wherein the water flow is perturbed due to the towing member. Using a fairing with slit angles that are smaller than the angle of inclination may contribute to reduction in vibration or drag caused by the water flow pattern. The reduction in vibration or drag may be enhanced when the slits are aligned with the flow pattern. In the illustrated embodiment, a portion of a towing member 320 is shown, where the towing member is towed through a body of water during a marine geophysical survey at angle of inclination 422.

In the illustrated embodiment, the undisturbed flow 430 of the water is shown in the in-line direction as the towing member 320 travels through the body of water. In contrast, once the water flow encounters towing member 320, which includes or is coupled to fairing with angled slits, the flow is perturbed as shown by arrow 432. In some embodiments, fairing with a slit angle that is less than the angle of inclination of a towing member may prevent the fairing from curling behind the towing member, particularly when the slit angle aligns with the perturbed flow of water caused by the towing member. During tests, reductions in drag coefficient have been observed when using slit angles that are less than the angle or inclination.

Figure 5:
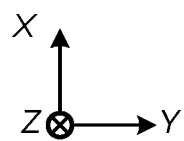
FIGS. 5 and 6 illustrate example slit angles for different example angles of inclination, according to some embodiments.
Figure 5:
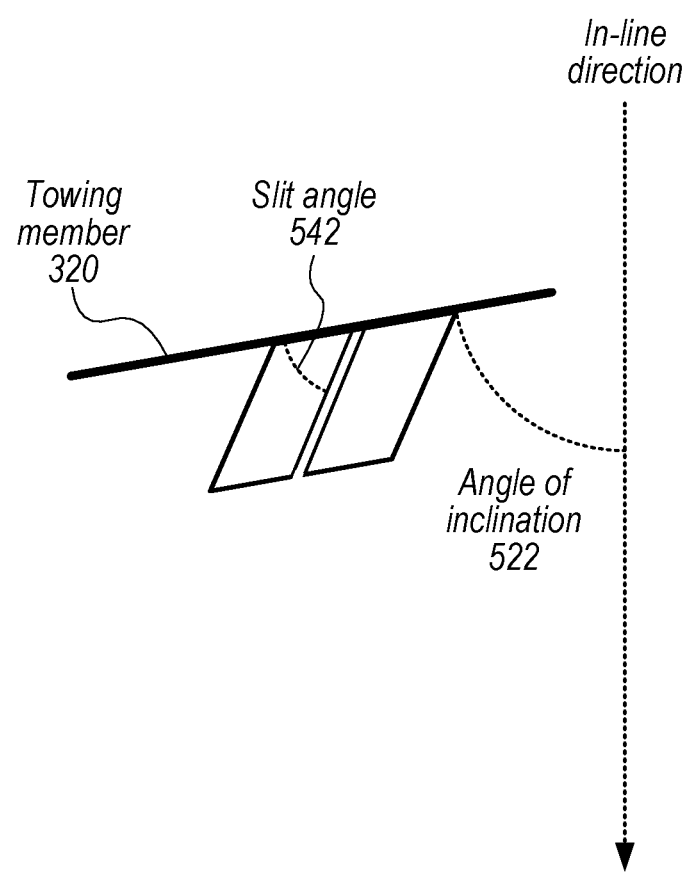
Figure 6:
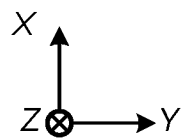
Figure 6:
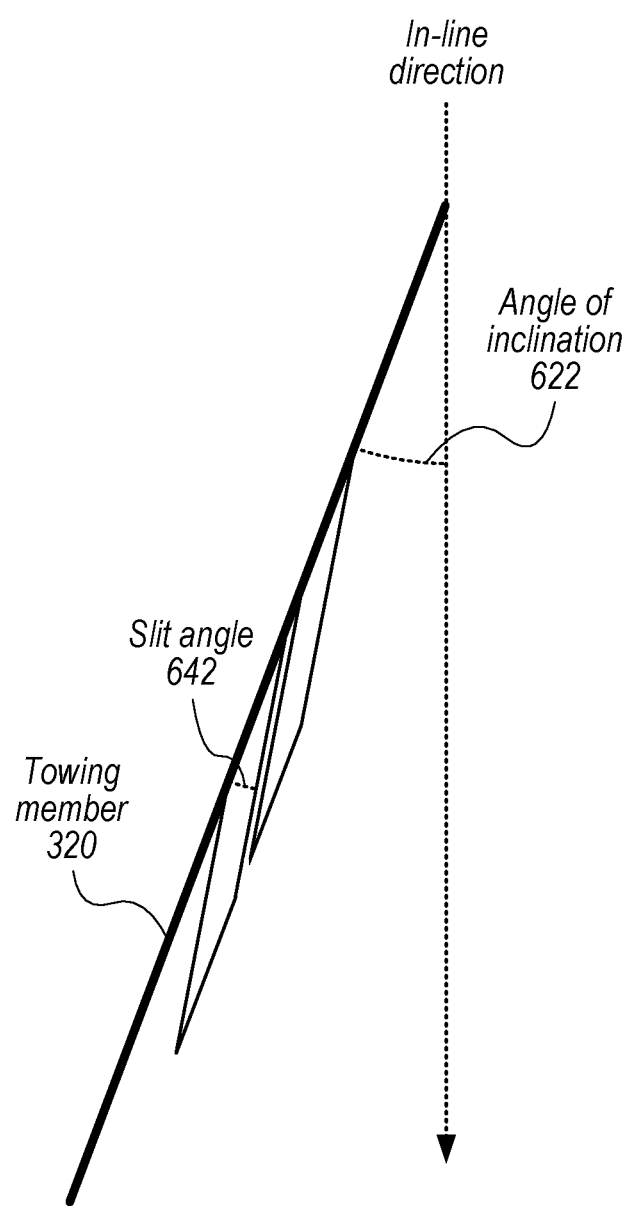

FIGS. 5 and 6 show additional examples of slit angles that are smaller than the angle of inclination for different angles of inclination, according to some embodiments. In the example of FIG. 5, towing member 320 is oriented at angle of inclination 522 of approximately 80 degrees, and the towing member fairing has a slit angle 542 that is approximately 61 degrees, which is smaller than the angle of inclination. In the example of FIG. 6, the angle of inclination 622 is approximately 21 degrees, and the slit angle 642 is approximately 10 degrees. Speaking generally, different ranges of slit angles may provide improved performance for different planned towing angles of inclination. For example, smaller angles of inclination may cause a greater amount of flow perturbation in a direction parallel to the tow member, which may tend to cause curling of the fairing, which may cause drag. Therefore, in some embodiments, for relatively smaller planned angles of inclination, relatively larger differences between slit angles and the angle of inclination are utilized.

Example Towing Member Curve and Fairing with Multiple Slit Angles

Figure 7:
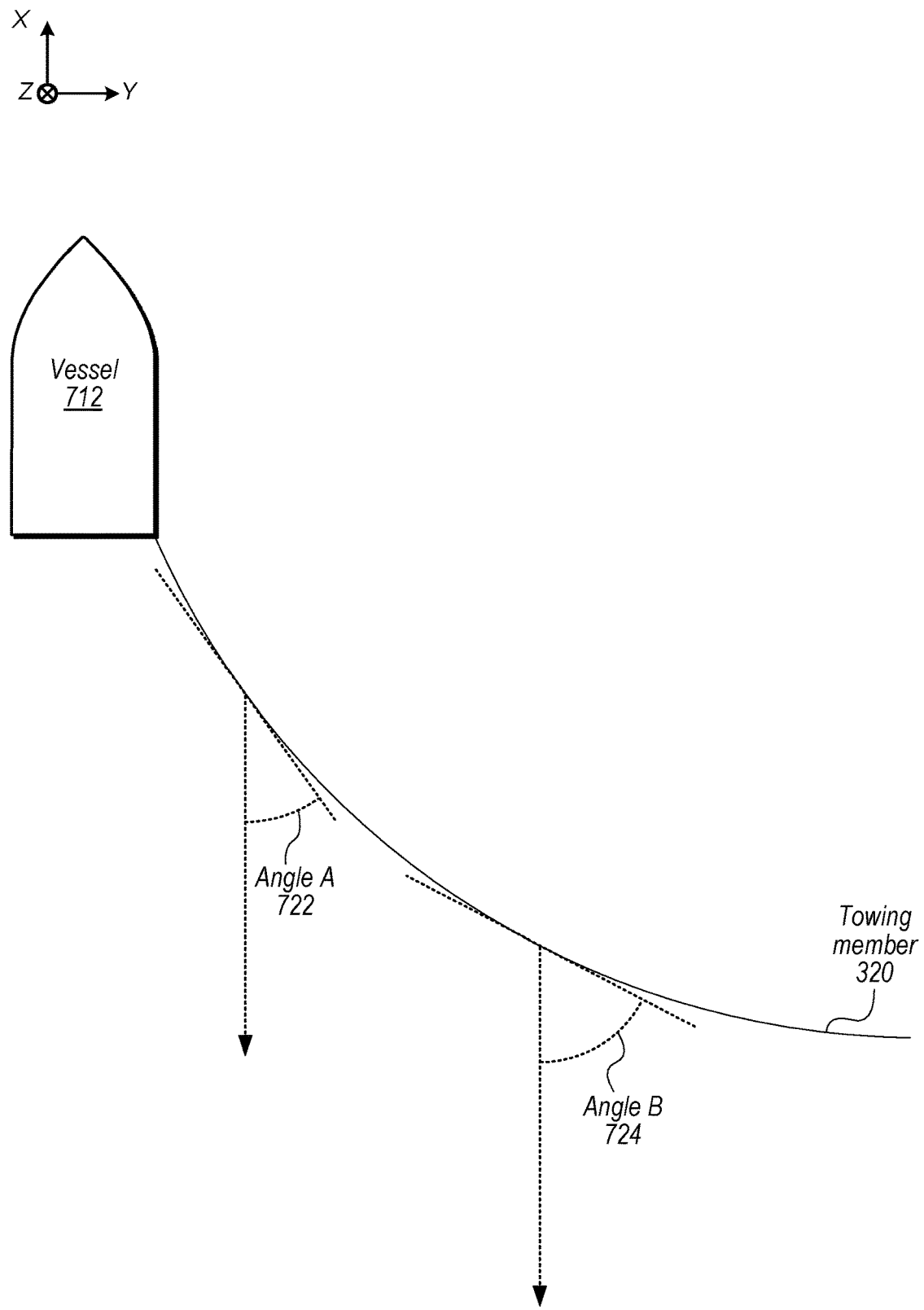
FIG. 7 illustrates example inclination angles at points along a towing member that curves during tow, according to some embodiments.

FIG. 7 illustrates example inclination angles at points along a towing member that curves during towing, according to some embodiments. In the illustrated embodiment, vessel 712 tows towing member 320 through a body of water during a geophysical survey. As it is being towed, towing member 320 may curve such that it has different angles of inclination at different points along the length of the towing member. For example, angles A 722 and B 724 are angles of inclination at two different points along towing member 320. In the illustrated embodiment, angle A is approximately 34 degrees, while angle B is approximately 66 degrees. In some embodiments, slit angles for different portions of fairing are determined based on different angles of inclination for corresponding portions of the towing member. Thus, different portions of the fairing may have slits at different angles relative to the towing member and slits at different points that are non-parallel to each other. In some embodiments, the towing is performed such that no slits in a set of multiple slits are parallel to the tow direction during tow. The towing member may be divided into different sections using various granularities, and slits within each section may share a slit angle.

Figure 8:
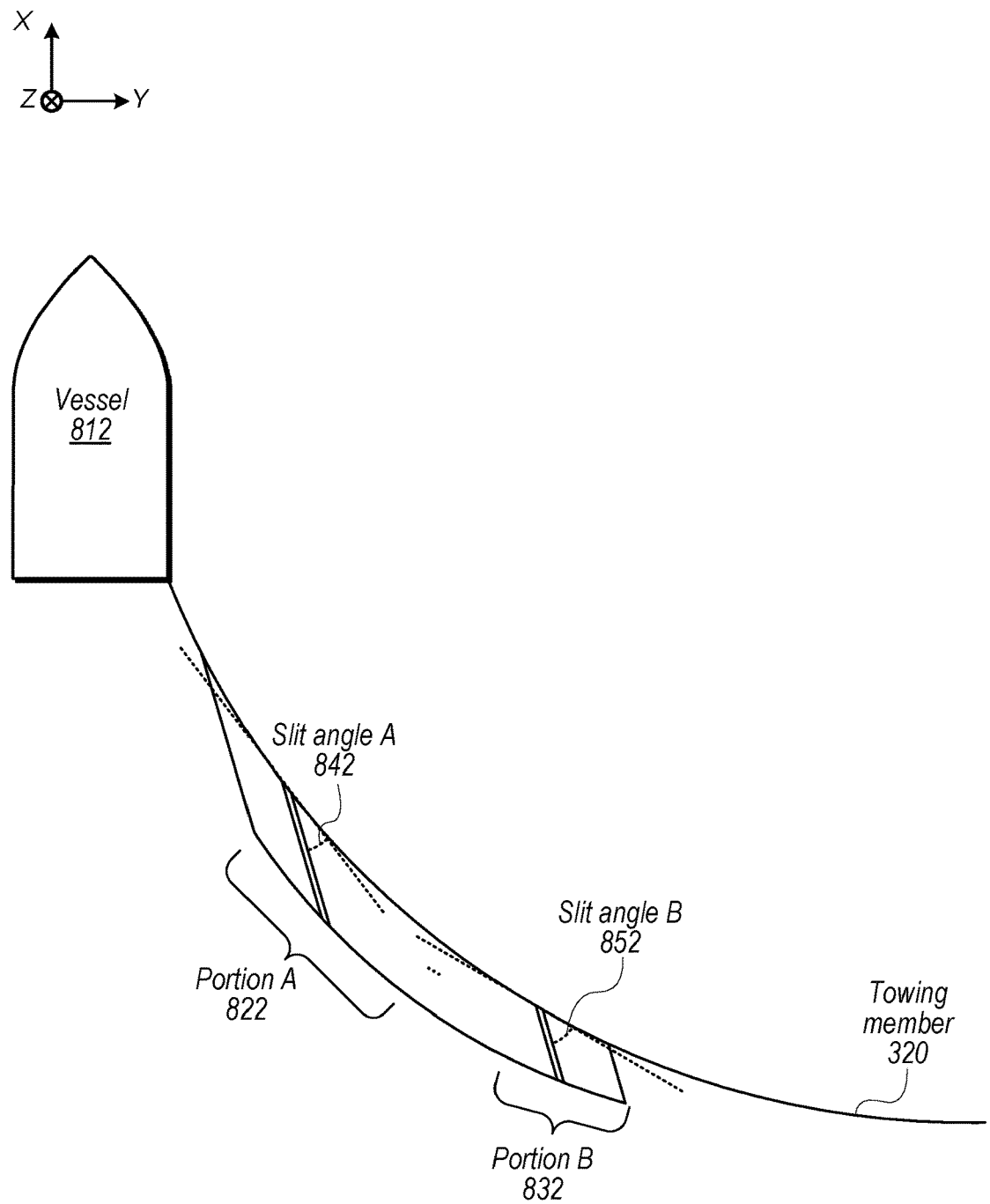
FIG. 8 illustrates example fairing slit angles for different portions of a towing member that have different corresponding angles of inclination, according to some embodiments.

FIG. 8 illustrates example fairing slit angles for different portions of a towing member based on corresponding angles of inclination, according to some embodiments. In the illustrated embodiment, vessel 812 tows towing member 320 through a body of water during a survey. A fairing with two different portions A 822 and B 832 is included in or attached to towing member 320. Within these portions of fairing, two different slits with angles A 842 and B 852 are shown. Note that other portions of fairing with different slit angles may be included in or attached to towing member 320 and the portions may include more than one fairing slit.

The slit angles may be determined within a portion of the fairing based on an average angle of inclination, maximum angle of inclination, angle of inclination at the center, etc. for the corresponding portion of the towing member. Slit angle A 842 is approximately 24 degrees and slit angle B is approximately 44 degrees, in the illustrated example. The angle of inclination at the point of the towing member corresponding to slit angle A is approximately 37 degrees while the angle of inclination at the point of the towing member corresponding to slit angle B is approximately 60 degrees. Therefore, the difference between the angle of inclination and the slit angle for slit A is approximately 13 degrees and the difference between the angle of inclination and the slit angle for slit B is approximately 16 degrees. The differences between slit angles and angles of inclination in different portions of the fairing may be the same or may be different. In some embodiments, the fairing slit angle for all portions of a towing member is determined based on a portion of the towing member with the largest planned average angle of inclination during tow.

Figure 9A:
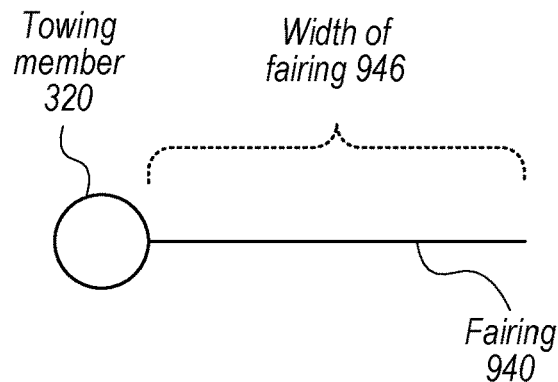
FIG. 9A illustrates an example cross-sectional view of a towing member and a fairing, according to some embodiments.

FIG. 9A illustrates an example cross-sectional view of a towing member with a fairing, according to some embodiments. As shown, towing member 320 includes or is attached to a fairing 940 that has a fairing width 946. As shown in the illustrated embodiment, the width 946 of the fairing is approximately four times the diameter of the towing member. In some embodiments, the width of fairing 940 is between three and six times the diameter of the towing member. Fairing widths toward the upper end of this range may advantageously increase vibrational damping, but wider fairing may increase in-line drag, so various widths within this range may be advantageous. In some embodiments, increasing the diameter of a towing member increases the perturbation of the water flow. Thus, as the diameter of the towing member increases, increasing the difference between slit angles of the towing member fairing and the angle of inclination may be desirable.

In some embodiments, a survey vessel, traveling in an in-line direction, tows survey equipment through a body of water using a towing member having an attached fairing that includes a slit between a first fairing portion and a second fairing portion, where the second fairing portion is closer to the survey vessel in a cross-line direction. In some embodiments, during the towing, the fairing extends behind the towing member such that an axis line of the slit intersects the towing member at an intersection point, where a tangent line to the towing member at the intersection point has an angle of inclination relative to the in-line direction.

In some embodiments, the slit angle of the one or more slits is at least 5 degrees less than the angle of inclination. In some embodiments, the slit angle is at least 10 degrees less than the angle of inclination. In some embodiments, the slit angle is between 15 and 40 degrees less than the angle of inclination. In some embodiments, the slit angle is between 50 percent and 90 percent of the angle of inclination. In some embodiments, the slit angle of the one or more slits relative to the towing member is between 40 percent and 85 percent of the angle of inclination. In some embodiments, a fairing may include at least first and second slits, wherein the slit angle of the first slit is different than the slit angle of the second slit.

In some embodiments, the towing member perturbs the body of water during the towing and the fairing slit aligns with a direction of the perturbed flow of water. In some embodiments, a width of the fairing that is attached to the towing member is between three times and six times greater than a diameter of the towing member. In some embodiments, the towing member is a cylindrical cable configured to tow a source survey element. In some embodiments, the towing member may be a lead-in cable (e.g., cable 18 in FIG. 1), a super wide rope (e.g., element 8 in FIG. 1), or an air gun cable. In some embodiments, the portion of the fairing having the one or more slits is a canvas material. In some embodiments, prior to the towing, a survey planning system determines the first angle based on a planned value for the angle of inclination and the fairing is configured with corresponding slit(s).

In some embodiments, a towing member is one or more of the following: a cable (e.g., a source cable), a paravane, a buoy, a rope, a chain, etc. In some embodiments, a towing member may be any of various shapes including: cylindrical (including parabolic, elliptic, or hyperbolic cylinders), triangular, rectangular, etc. In some embodiments, the towing member is a cable and the survey equipment is a signal source.

In some embodiments, the fairing slit angle for a portion of fairing is determined based on an average angle of inclination for the portion. In some embodiments, fairing slit angles for multiple portions of the towing member are determined based on a portion of the towing member with a smallest average angle of inclination. In some embodiments, the survey vessel, using the survey equipment, records one or more seismic signals and stores the recorded one or more seismic signals on a tangible, computer-readable medium, thereby manufacturing a geophysical data product. In some embodiments, a computing system determines, prior to the towing, the slit angle based on a planned value for the angle of inclination. The fairing may be configured to have one or more slits at the slit angle determined based on the planned value.

In some embodiments, a fairing that is included in or configured to couple to a towing member that is configured to tow marine survey equipment includes one or more slits that are non-perpendicular to a portion of the towing member that the fairing extends from. In some embodiments, during towing of the marine survey equipment, a trailing end of one of the slits is closer to an aft end of the towing member, in a cross-line direction, than is a leading end of the slit. In some embodiments, during towing of the marine survey equipment, one of the slits that are non-perpendicular to the portion of the towing member are non-parallel to the in-line direction.

Figure 9B:
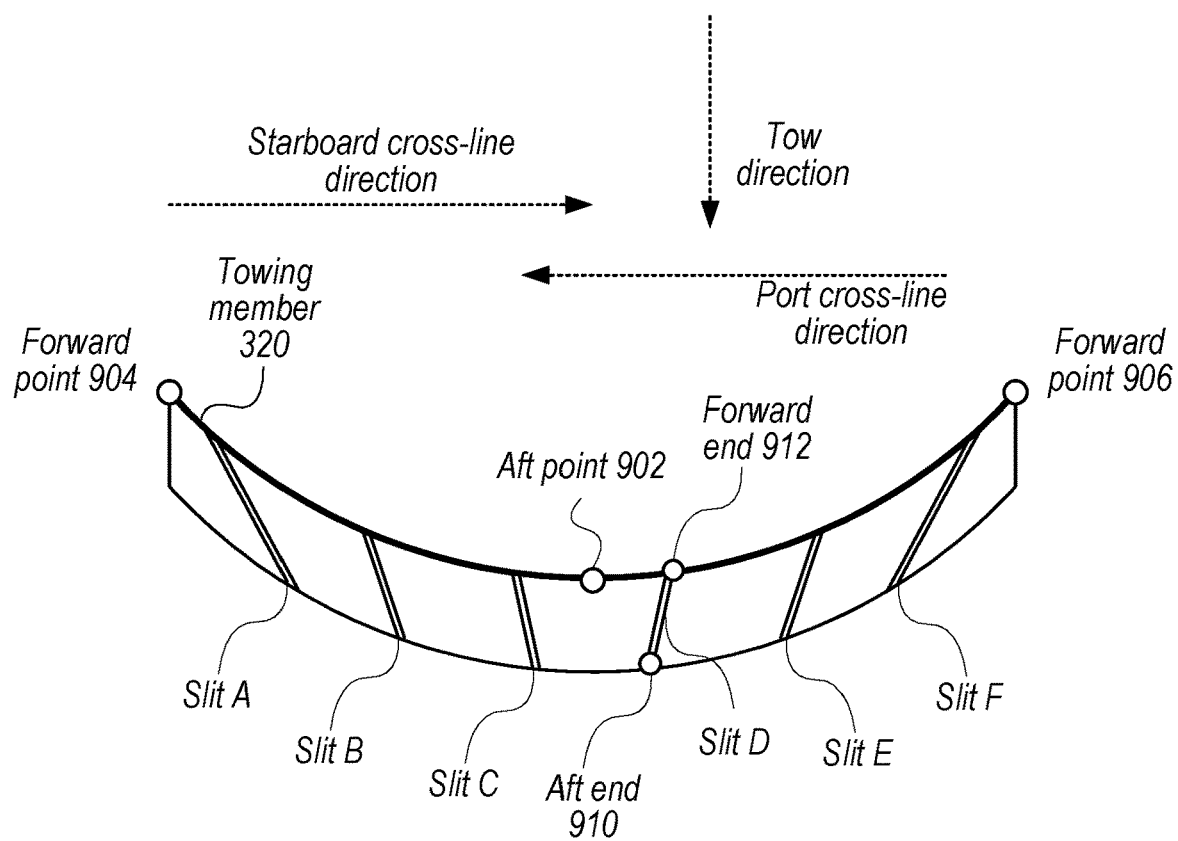
FIG. 9B illustrates an example fairing with slits in different directions, according to some embodiments.

FIG. 9B is a diagram illustrating an example towing member 320 towed at multiple points with slits in different directions, according to some embodiments. The towing member 320 may be towed between two para-vanes, between a para-vane and another element such as a vessel or a streamer, between streamers, between a survey element such as the vessel and a survey source element, between a vessel and a streamer, etc.

In some embodiments, the towing member 320 is a spreader cable. In the illustrated embodiments, the fairing includes six slits A-F. Consider an example situation in which the entire illustrated portion of the fairing is towed to the left of a center of the survey array. In this situation, slits A-C point back towards the center of the array while slits D-F point away from the center of the array. Each of the illustrated slits, however, has a slit angle formed by its tangent line and slit axis that is acute and is smaller than its angle of inclination.

Both starboard and port cross-line directions and the tow direction are also shown in FIG. 9B. In the illustrated example, the towing member 320 has an aft point 902 and two forward points 904 and 906. The aft point is offset, in a crossline direction, from each of the forward points (offset in the starboard direction from forward point 904 and offset in the port direction from forward point 906). Slits A-C are located in the portion of the fairing disposed between forward point 904 and aft point 902 while slits D-F are located in the portion of the fairing disposed between aft point 902 and forward point 906. In the illustrated example, the aft end 910 of the slit axis of slit D is offset from the forward end 912 of the slit axis in the same crossline direction (port) that the aft point 902 is offset from the forward point 906.

Cable vibration induced by vortex shedding may cause wear in the cable, which may cause premature failure of the cable (e.g., breaking, tearing, etc.). The fairing discussed in disclosed embodiments may reduce this vibration in seismic cables and, as a result, may advantageously reduce wear on the cable. In some embodiments, the drag coefficient of a cable being towed in a body of water may advantageously be reduced by introducing fairing slits, particularly fairing slits with angles relative to the cable that are more than 20% less than the angle of inclination. In some embodiments, reducing drag on a cable may improve survey efficiency, which may allow for larger amounts of equipment to be used in marine geophysical surveys. This may improve the quality of recorded survey data which may improve accuracy in images of geological structure that are generated based on the survey data.

Additional Discussion Regarding Slit Angles

The following discussion sets out additional ways to described embodiments of slit angles that may reduce vibration or drag of towing members. In some embodiments, the tangent line at the intersection point has a slit angle relative to a lateral side of a portion of the fairing, where the lateral side is the closest side of the fairing portion to the survey vessel, in the cross-line direction. For example, this lateral side of the portion of the fairing is closer to the survey vessel, in the cross-line direction, than the other lateral side of the portion of the fairing. In some embodiments, a trailing end of a fairing slit is closer to an aft end of the towing member, in a cross-line direction, than a leading end of the fairing slit.

For example, referring back to FIG. 3A, slit axis 354 defines a slit angle 342 relative to the lateral side 346 of fairing portion 340A. Typically, a quadrilateral-shaped fairing portion has fore and aft sides as well as two lateral sides. In the illustrated example, the lateral side 346 of fairing portion 340A is the closest lateral side to the survey vessel in the cross-line direction. For example, at any given coordinate in the in-line direction, lateral side 346 of fairing portion 340A is closer to the survey vessel in the cross-line direction than the other lateral side of portion 340A.

In the illustrated example, slit angle 342 is measured from tangent line 328 relative to lateral side 346. Note that there is also a supplementary angle between the tangent line 328 and the lateral side 346 measured in the other direction across fairing portion 340B, but that angle is not "relative to" the lateral side 346, as used herein, because it crosses over the slit. In contrast, the slit angle 342 is measured across the fairing portion 340A and does not cross the fairing slit. Similarly, the supplementary angle may be described as measured from the tangent line 328 relative to a lateral side of the other fairing portion 340B. In the illustrated embodiment, the tangent line 328 is divided by the axis line 354 of the fairing slit. Note that an angle measured "relative to" a lateral side of a fairing portion, in disclosed embodiments, is measured from the side of the tangent line on the side of the axis line on which the fairing portion resides, without crossing the tangent line. For example, in the illustrated embodiment, slit angle 342, measured relative to lateral side 346 of fairing portion 340A, is measured from the side of tangent line 328 on the side of axis line 354 on which fairing portion 340A resides.

In some embodiments, a survey vessel, traveling in an in-line direction, tows survey equipment through a body of water using a towing member having an attached fairing that includes a slit between a first fairing portion and a second fairing portion, where the second fairing portion is closer to the survey vessel in a cross-line direction. In some embodiments, during the towing, the fairing extends behind the towing member such that an axis line of the slit intersects the towing member at an intersection point, where a tangent line to the towing member at the intersection point has an angle of inclination relative to the in-line direction. In some embodiments, the tangent line to the towing member at the intersection point has a slit angle relative to a first lateral side of the first fairing portion, where the first lateral side is closest to the survey vessel in the cross-line direction. In some embodiments, the slit angle is less than the angle of inclination.

In some embodiments, the tangent line to the towing member at the intersection point has a slit angle relative to a first lateral side of the first fairing portion, where the first lateral side is closest to the survey vessel in the cross-line direction.

Example Computing Device

Figure 10:
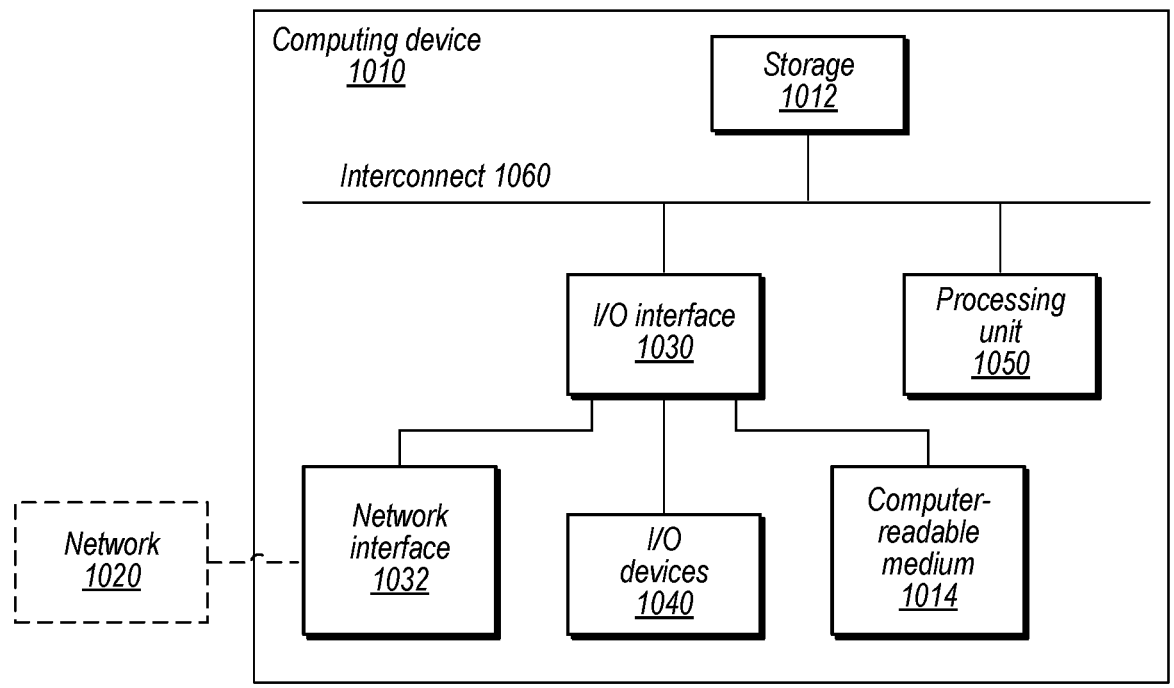
FIG. 10 is a block diagram illustrating an exemplary computing device, according to some embodiments.

Turning now to FIG. 10, a block diagram of a computing device 1010 (which may also be referred to as a computing system) is depicted, according to some embodiments. Computing device 1010 may be used to implement various portions of this disclosure. For example, computing device 1010 may be used to generate a geophysical data product based on a survey conducted using disclosed fairing embodiments. Computing device 1010 is one example of a device that may be used as a mobile device, a server computing system, control equipment, a client computing system, or any other computing system implementing portions of this disclosure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. I/O interface 1030 may also be coupled to network interface 1032, which may be coupled to network 1020 for communications with, for example, other computing devices. I/O interface 1030 may also be coupled to computer-readable medium 1014, which may store various survey data such as sensor measurements, survey control parameters, etc.

As described above, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on.

Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein. In at least some embodiments, storage subsystem 1012 may represent an example of a non-transitory computer-readable medium that may store executable instructions.

In the illustrated embodiment, computing device 1010 further includes non-transitory medium 1014 as a possibly distinct element from storage subsystem 1012. For example, non-transitory medium 1014 may include persistent, tangible storage such as disk, nonvolatile memory, tape, optical media, holographic media, or other suitable types of storage. In some embodiments, non-transitory medium 1014 may be employed to store and transfer geophysical data and may be physically separable from computing device 1010 to facilitate transport. Accordingly, in some embodiments, the geophysical data product discussed above may be embodied in non-transitory medium 1014. Although shown to be distinct from storage subsystem 1012, in some embodiments, non-transitory medium 1014 may be integrated within storage subsystem 1012.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1040.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

It is to be understood the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A method, comprising:
   towing equipment through a body of water using a towing member with an attached or integrally formed fairing that extends behind the towing member;
   wherein the fairing includes a slit having a slit axis that intersects the towing member at an intersection point;
   wherein the towing is performed such that the slit axis is not parallel to a tow direction of the intersection point and the slit axis is not perpendicular to a reference line that is tangent or parallel to the towing member at the intersection point; and
   wherein the towing is performed such that a reference line that is tangent or parallel to the towing member at the intersection point defines both:
     an acute angle of inclination relative to the tow direction; and
     a first slit angle relative to the slit axis, wherein the first slit angle is smaller than the angle of inclination.

2. The method of claim 1, wherein the towing is performed such that the first slit angle is at least 5 degrees smaller than the angle of inclination.

3. The method of claim 1, wherein the towing is performed such that that first slit angle is between 40 percent and 85 percent of the angle of inclination.

4. The method of claim 1, wherein the fairing includes a second slit having a second slit axis, and wherein the towing is performed such that:
   the towing member defines a curve;
   the second slit axis intersects the towing member at a second intersection point;
   a second reference line that is tangent or parallel to the towing member at the second intersection point defines a second slit angle relative to the second slit axis; and
   the second slit angle is different than a first slit angle formed by the slit axis and the intersection point.

5. The method of claim 4, wherein neither of the first and second slit angles is parallel to the tow direction.

6. The method of claim 1, wherein the towing is performed such that:
   the towing member creates a perturbed flow direction of water passing over the towing member and fairing; and
   the slit axis aligns with the perturbed flow direction.

7. The method of claim 1, wherein the towing is performed during a geophysical survey, and wherein the method further comprises:
   recording one or more seismic or electromagnetic signals containing information about subsurface geology; and storing the recorded signals on a tangible, computer-readable medium, thereby completing the manufacture of a geophysical data product.

8. The method of claim 1, further comprising:
determining, prior to the towing, a first slit angle between the reference line and the slit axis based on a planned value for the angle of inclination; and
configuring, based on the determining, the fairing to have one or more slits that will exhibit the first slit angle during the towing.

9. The method of claim 1, wherein the towing is performed such that:
an aft point on the towing member is offset, in a crossline direction, from a forward point on the towing member;
the slit is located in a portion of the fairing that is disposed between the aft and forward points on the towing member; and
an aft end of the slit axis is offset from a forward end of the slit axis in the same crossline direction.

10. The method of claim 9, wherein the crossline direction is port.

11. The method of claim 9, wherein the crossline direction is starboard.

12. A system, comprising:
a marine fairing that includes a slit having a slit axis;
wherein the fairing is integrally formed with, or is configured to be attached to, a longitudinal towing member such that the slit axis intersects the towing member at an intersection point;
wherein the slit axis is not perpendicular to a reference line that is tangent or parallel to the towing member at the intersection point;
wherein the towing member is configured to be towed in a manner such that an aft point on the towing member is offset, in a crossline direction, from a forward point on the towing member;
wherein the slit is configured to be located in a portion of the fairing that will be disposed between the aft and forward points on the towing member during towing; and
wherein the slit is further configured such that, during towing, an aft end of the slit axis will be offset from a forward end of the slit axis in the same crossline direction.

13. The system of claim 12, further comprising the towing member, and wherein the towing member comprises a cable.

14. The system of claim 12, further comprising the towing member, and wherein the towing member is configured to be coupled between a vessel and a survey source.

15. The system of claim 12, further comprising the towing member, and wherein the towing member is configured to be coupled between a vessel and a paravane.

16. The system of claim 12, further comprising the towing member, and wherein the towing member is configured to be coupled between a vessel and a geophysical streamer.

17. The system of claim 12, further comprising the towing member, and wherein the towing member is configured to be coupled between two geophysical streamers.

18. The system of claim 12, wherein a width of the fairing is between three and six times greater than a diameter of the towing member.

19. The system of claim 18, wherein a length of the slit is less than the width of the fairing.

20. The system of claim 12, wherein the crossline direction is port.

21. The system of claim 12, wherein the crossline direction is starboard.

22. The system of claim 12, wherein:
the fairing includes a second slit having a second slit axis that intersects the towing member at a second intersection point;
the second slit axis is not perpendicular to a second reference line that is tangent or parallel to the towing member at the second intersection point; and
the slit axis and second slit axes are not parallel with one another.

23. The system of claim 12, further comprising the towing member, and wherein the fairing and towing member are configured to be towed in a manner such that the reference line defines both:
an acute angle of inclination relative to a tow direction of the intersection point; and
a first slit angle relative to the slit axis, wherein the first slit angle is smaller than the angle of inclination.

24. The system of claim 23, wherein the first slit angle is at least 10 degrees smaller than the angle of inclination.

25. The system of claim 23, wherein the first slit angle is between 15 and 40 degrees smaller than the angle of inclination.

26. The system of claim 23, wherein the first slit angle is between 50 percent and 90 percent of the angle of inclination.

27. The system of claim 23, wherein the fairing includes a second slit having a second slit axis, and wherein:
the second slit axis intersects the towing member at a second intersection point;
a second reference line that is tangent or parallel to the towing member at the second intersection point defines a second slit angle relative to the second slit axis; and
the second slit angle is different than the first slit angle.

28. A system, comprising:
a fairing that is included in or configured to couple to a towing member that is configured to tow marine equipment, wherein a portion of the fairing includes one or more slits that are non-perpendicular to a portion of the towing member from which the fairing extends.

29. The system of claim 28, wherein the fairing is configured such that, during tow, a trailing end of one of the slits will be closer to a trailing end of the towing member, in a cross-line direction, than is a leading end of the slit.

30. The system of claim 29, wherein the fairing is further configured such that the slit will be disposed between the leading and trailing ends of the towing member during tow.

31. The system of claim 28, wherein the fairing is configured such that one of the slits that is non-perpendicular to the portion of the towing member is further configured to be non-parallel to a tow direction of the portion of the towing member during tow.

32. An apparatus, comprising:
towing means for towing survey equipment behind a vessel through a body of water in an in-line direction;
fairing means for controlling vibration of the towing means, wherein the fairing means includes a slit;
wherein the apparatus is configured such that, during towing by the towing means, the fairing means will extend behind the towing means such that an axis line of the slit intersects the towing means at an intersection point, wherein a reference line that is tangent or parallel to the towing means at the intersection point defines:
an angle of inclination relative to the in-line direction, wherein the angle of inclination is an acute angle; and
a slit angle relative to the slit axis, wherein the slit angle is smaller than the angle of inclination.

33. The apparatus of claim 32, wherein the slit angle is at least 10 degrees smaller than the angle of inclination.

34. The apparatus of claim 32, wherein the slit angle is between 15 and 40 degrees smaller than the angle of inclination.

\* \* \* \* \*